United States Patent
Ono et al.

(10) Patent No.: US 7,310,476 B2
(45) Date of Patent: Dec. 18, 2007

(54) IMAGING APPARATUS

(75) Inventors: Hideharu Ono, Hitachinaka (JP);
Shigehisa Rokuta, Mito (JP); Makoto Kikuchi, Hitachinaka (JP); Kazunori Uemura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 11/114,679

(22) Filed: Apr. 25, 2005

(65) Prior Publication Data

US 2005/0281551 A1    Dec. 22, 2005

(30) Foreign Application Priority Data

Jun. 17, 2004   (JP)   ............... 2004-179146

(51) Int. Cl.
  *G03B 3/10*    (2006.01)
  *G03B 17/00*   (2006.01)
(52) U.S. Cl. ................ 396/79; 396/85; 396/133
(58) Field of Classification Search ........... 396/79–83, 396/85–87, 91–93, 133, 134
See application file for complete search history.

(56) References Cited

U.S. PATENT DOCUMENTS

| | | | | |
|---|---|---|---|---|
| 4,959,726 A | * | 9/1990 | Miida et al. ............. | 348/350 |
| 5,077,571 A | * | 12/1991 | Takayama et al. ...... | 396/134 |
| 6,046,770 A | * | 4/2000 | Uemura et al. ......... | 348/240.99 |
| 6,618,559 B1 | * | 9/2003 | Hofer ..................... | 396/87 |

FOREIGN PATENT DOCUMENTS

| | | |
|---|---|---|
| JP | 05-297437 A | 11/1993 |
| JP | 06-006653 A | 1/1994 |
| JP | 06-148500 A | 5/1994 |
| JP | 09-247517 | 9/1997 |
| JP | 2001-305419 A | 10/2001 |
| JP | 2002-303778 A | 10/2002 |

OTHER PUBLICATIONS

Patent Office of the People's Republic of China (SIPO) office action for SIPO application CN2005100694649 Feb. 16, 2007.

* cited by examiner

*Primary Examiner*—W. B. Perkey
(74) *Attorney, Agent, or Firm*—Townsend and Townsend and Crew LLP

(57) ABSTRACT

An imaging apparatus is provided which performs optimum zooming and focusing even after long use. The imaging apparatus includes: a lens which is movable along the optical axis; a driving module to drive the lens; a driving amount calculation module to determine a drive count indicating the number of times the driving module has been operated or a drive time for which the driving module has been operated; a storage module to store compensation amounts which are used to compensate for the mechanical play of the driving module according to the drive count or the drive time; and a control module to control the driving module wherein a compensation amount appropriate for the drive count or time determined by the driving amount calculation module is selected from the compensation amounts stored in the storage module and the selected compensation amount is used to compensate for the mechanical play of the driving module.

5 Claims, 8 Drawing Sheets

DURING FORWARD OPERATION

IMMEDIATELY AFTER DIRECTION IS REVERSED

DRIVEN BY 20 STEPS AFTER REVERSAL

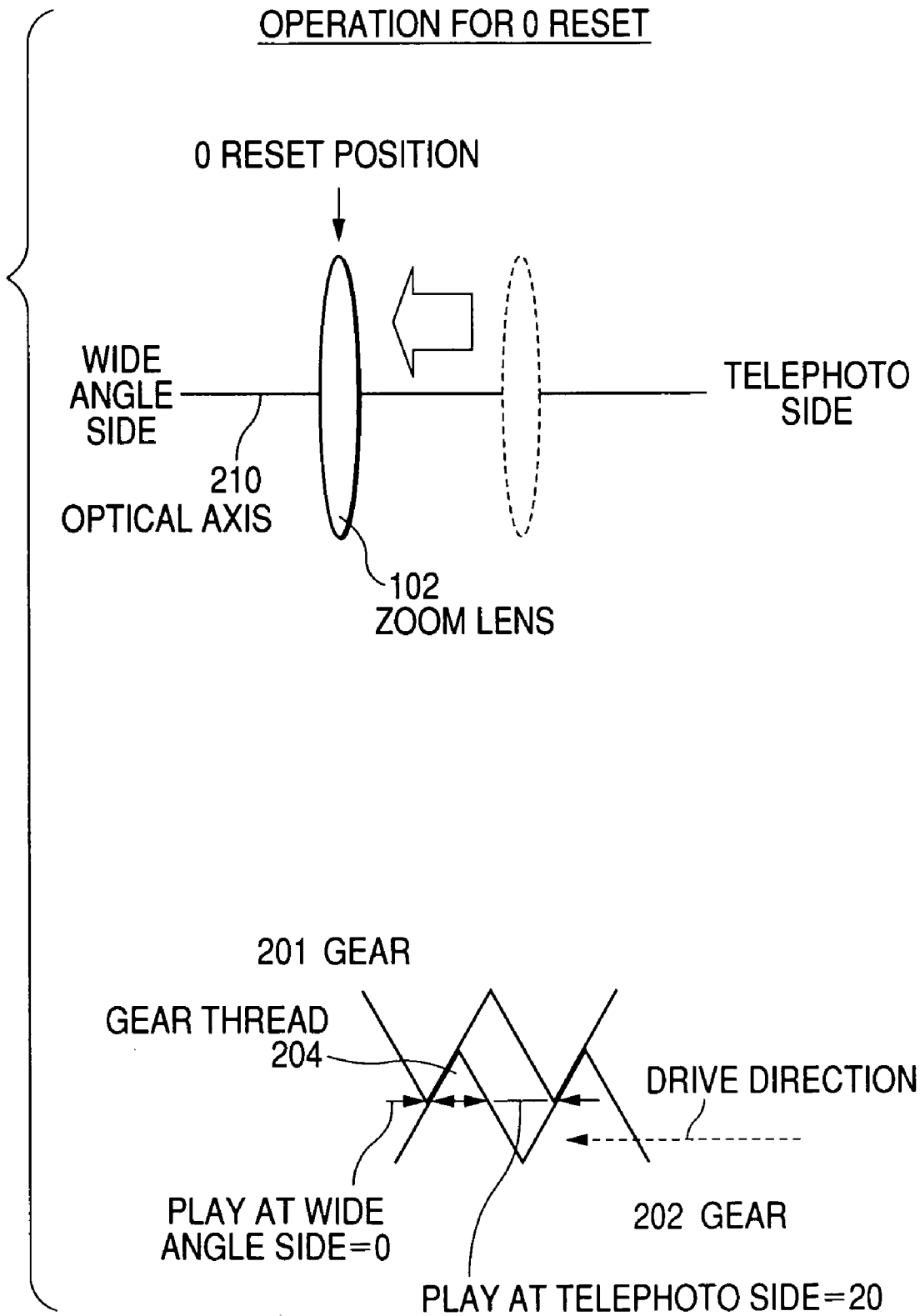

FIG. 4
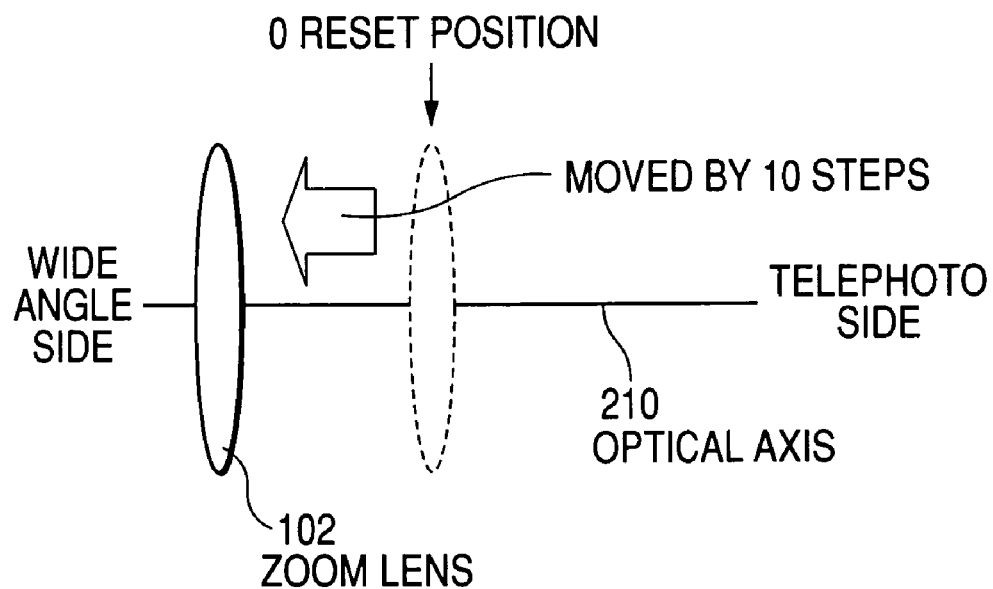
DRIVEN BY 10 STEPS IN WIDE ANGLE DIRECTION
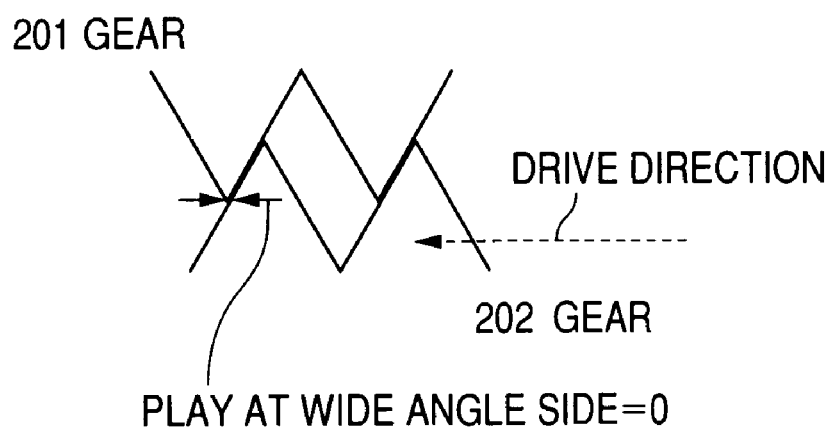

FIG. 5
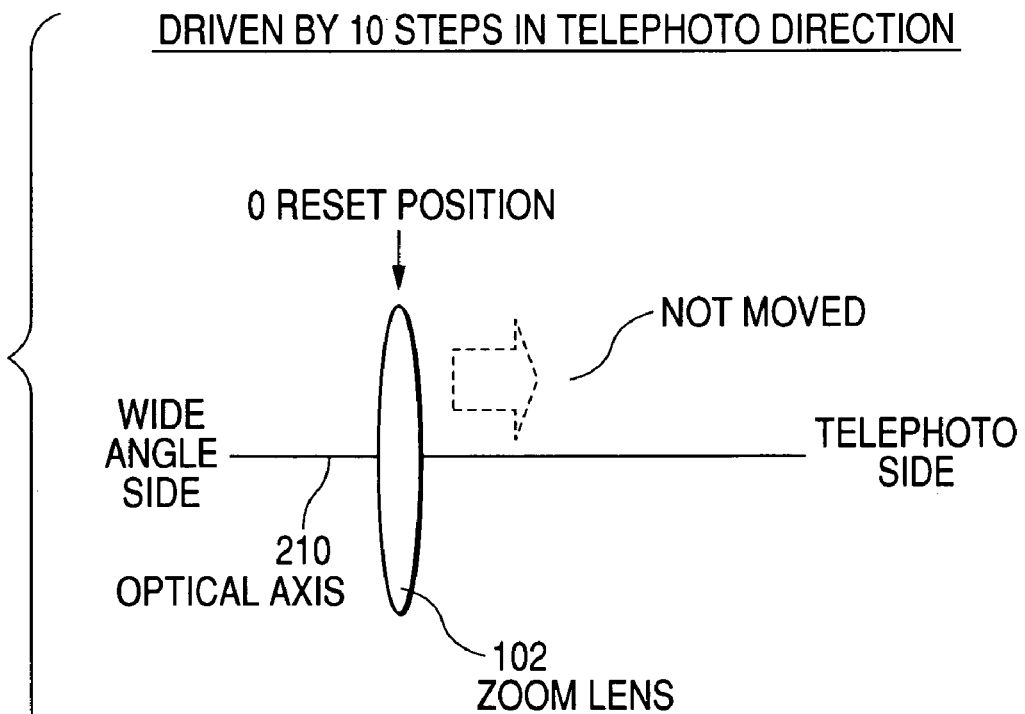
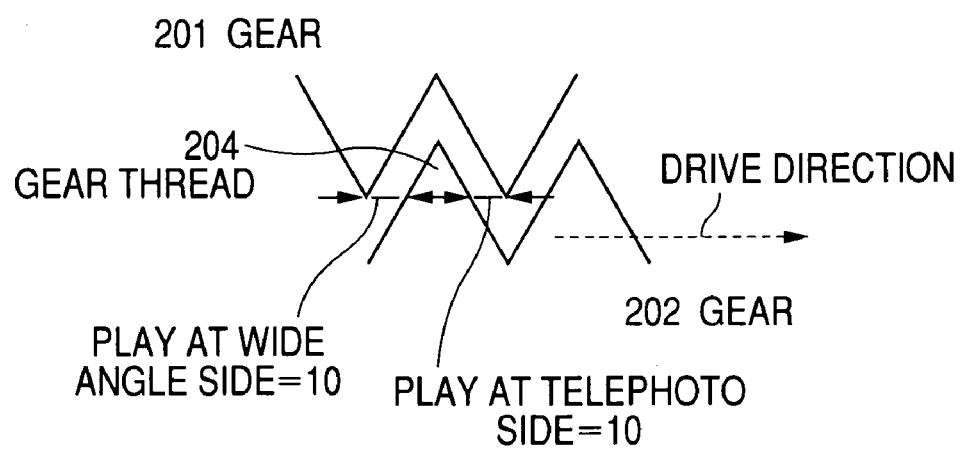

SETTING OF COMPENSATION CHANGE TABLE

COMPENSATION IN CONTROL ZOOM POSITION

IMAGING APPARATUS

CLAIM OF PRIORITY

The present application claims priority from Japanese application serial no. P2004-179146, filed on Jun. 17, 2004, the content of which is hereby incorporated by reference into this application.

BACKGROUND OF THE INVENTION

The present invention relates to an imaging apparatus.

A prior art technique in this field is described in, for example, Japanese patent Laid-open No. 9-247517. In this publication, its object is described such that optical zooming means and electronic zooming means are smoothly interlocked with each other. In addition, its solving means is described such that the smooth interlocking operation is attained by changing its interlocking operation starting point according to the current mechanical play of the optical zooming means, which is calculated from a value stored in a memory as the typical mechanical play of the optical zooming means and lens driving information.

SUMMARY OF THE INVENTION

Usually, a surveillance camera apparatus has a camera fixed on a camera swivel so that the camera can freely be panned and tilted. In a surveillance camera system, it is possible to pan/tilt the camera by controlling the camera swivel through an external controller. Zooming and other operations are also possible, allowing the camera to freely change the object of shooting. Such a surveillance camera system is usually provided with sequence function and alarm function. The sequence function memorizes plural objects of shooting and shoots these memorized objects sequentially and periodically. The alarm function, if something abnormal is found by one of the human detection and other sensors located in the surveillance area, immediately directs the camera to that place.

In this case, it is necessary to quickly zoom or focus on each object of shooting by quickly moving the zoom lens or focus lens to a certain position. As known, a stepping motor-used lens driving mechanism is conventionally used as means to move a lens along the optical axis. In such a lens driving mechanism, an open loop is formed by a lens drive control module and a stepping motor to determine the position of the zoom lens or focus lens. By continuously monitoring the number of stepping motor driving steps, the lens drive control module equivalently recognizes the lens position.

However, the lens is driven by the stepping motor via gears or the like. Mechanical play is inherently present where the gears are engaged with each other. If the amount of play is zero, the lens drive control module can equivalently recognize the accurate lens position by continuously monitoring the number of stepping motor driving steps. However, as the amount of play increases, the lens position recognized by the lens drive control module includes an increasing error. When the lens driving direction is reversed, the lens is not moved unless driven more than the mechanical play. Note that this mechanical play is not determined uniquely by the design but subject to manufacturing fluctuations and changes with temperature.

Accordingly, a technique for performing optimum position control by using a typical mechanical play value stored in a memory in advance and lens drive control information is described in Japanese patent Laid-open No. 9-247517 and others.

In some cases, however, merely storing a typical mechanical play value in a memory is inadequate if the lens is driven many times or for long time. For example, a surveillance camera is usually operated 24 hours a day and provided with such a sequence function as to sequentially and periodically switch the object of shooting among the plural objects memorized. The number of times the zoom and focus lenses are moved is by far larger than in consumer-use cameras. Therefore, such a camera system is critically required to not only provide reliable basic performance but also retain the performance even after long use.

In a system which drives a lens by a stepping motor via gears or the like, mechanical play is inherently present where the gears are engaged with each other. This mechanical play gradually becomes larger as a result of repeatedly driving the lens since the engaged portions of the gears are gradually deteriorated due to mechanical stress, aging, etc.

If the mechanical play of the lens driving mechanism becomes larger than the typical play value stored in the memory in advance, reversing the lens drive direction may result in inappropriate zooming or focusing since the lens is less driven or not driven at all.

With the aforementioned point in mind, it is an object of the present invention to improve the reliability of an imaging apparatus.

According to an aspect of the present invention, there is provided an imaging apparatus comprising: a lens which is movable along the optical axis; a driving module to drive the lens; a driving amount calculation module to determine a drive count indicating the number of times the driving module has been operated or a drive time for which the driving module has been operated; a storage module to store compensation amounts which are used to compensate for mechanical play of the driving module according to the drive count or the drive time; and a control module to control the driving module wherein a compensation amount appropriate for the drive count or time determined by the driving amount calculation module is selected from the compensation amounts stored in the storage module and the selected compensation amount is used to compensate for the mechanical play of the driving module.

According to the aspect of the present invention, the reliability of the imaging apparatus can be improved.

BRIEF DESCRIPTION OF THE DRAWING

These and other features, objects and advantages of the present invention will be become more apparent from the following description when taken in conjunction with the accompanying drawings wherein:

FIG. 3 is a diagram for explaining how play occurs after zero reset is done for the zoom lens;

FIG. 4 is a diagram for explaining how play occurs after the zoom lens is moved in the wide angle direction;

FIG. 5 is a diagram for explaining how play changes after the zoom lens is moved in the telephoto direction;

DETAILED DESCRIPTION OF PREFERRED EMBODIMENTS

Preferred embodiments of the present invention will be explained below.

Embodiment 1

The following describes a first embodiment of the present invention with reference to the drawings.

Figure 1:
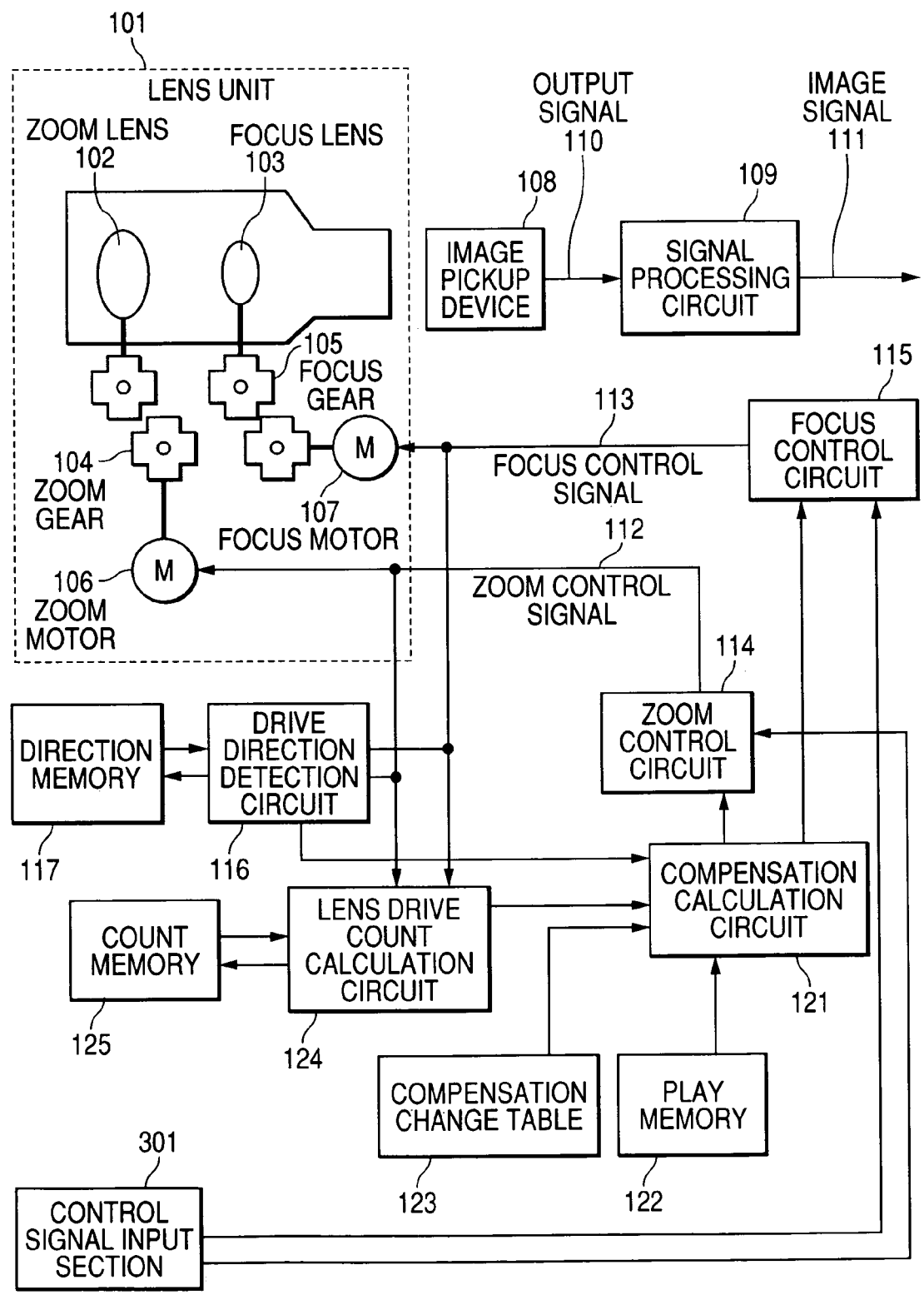
FIG. 1 is a block diagram of a surveillance camera apparatus according to a first embodiment of the present invention.

FIG. 1 is a block diagram of an imaging apparatus according to the first embodiment of the present invention (hereinafter referred to as the present embodiment). In this figure, numeral 101 designates a lens unit; 102, a zoom lens; 103, a focus lens; 108, an image pickup device; 109, a signal processing circuit; 104, a zoom lens drive gear (hereinafter referred to as a zoom gear); 105, a focus lens drive gear (hereinafter referred to as a focus gear); 106, a stepping motor for driving the zoom lens (hereinafter referred to as a zoom motor); 107, a stepping motor for driving the focus lens (hereinafter referred to as a focus lens); 114, a zoom control circuit; 115, a focus control circuit; 116, a drive direction detection circuit; 117, a direction memory; 121, a compensation calculation circuit; 122, a play memory; 123, compensation change table; 124, a lens drive count calculation circuit; 125, a count memory; 301, a control signal input section.

In the present embodiment, a control signal from a control circuit in a camera swivel not shown in the figure is transferred to the control signal input section 301. Given that the control signal is a signal to drive the zoom lens 102, the zoom motor 106 is rotated by a certain number of steps required by a zoom signal 112 from the zoom control circuit 114. (Hereinafter the moving distance of the lens is expressed in rotation steps of the motor.) Rotation of the zoom motor 106 is transmitted to the zoom lens 102 via the zoom gear 104, which moves the zoom lens 102 by the required number of steps. The zoom control signal 112 is continuously monitored by the zoom control circuit 114 to calculate the position of the zoom lens 102 relative to a reference position (hereinafter referred to as the 0 reset position) not shown in the figure in terms of steps of the zoom motor 102. The calculated position is assumed as the zoom position in the control domain (hereinafter referred to as the control zoom position).

In addition, the drive direction detection circuit 116 continuously monitors the direction of rotation of the zoom motor 106 (i.e., the moving direction of the zoom lens 102) based on the zoom control signal 112 and stores the direction of rotation in the direction memory 117. Thus, the drive direction detection circuit 116 can detect whether the current direction of rotation is the same as or opposite to the direction in the previous drive.

Similarly, the focus lens 103 in the present invention is moved by the focus motor 107 which is rotated as many steps as required by a focus control signal 113 from the focus control circuit 115. Rotation of the focus motor 107 is transmitted to the focus lens 103 via the focus gear 105 to move the focus lens 103 by the required number of steps. The focus control signal 113 is also continuously monitored by the focus control circuit 115 to calculate the position of the focus lens 103 relative to a reference position in terms of steps of the focus motor 103. The calculated position is assumed as the focus position in the control domain, too. Likewise, the drive direction detection circuit 116 can detect the direction of rotation of the focus motor 107 based on the focus control signal 113 as well.

Note that light which is obtained from an object, not shown in the figure, via the zoom lens 102 and the focus lens 103 is converted into an electrical signal by the image pickup device 108. The output signal 110 is input to the signal processing circuit 110 which outputs a video signal 111 obtained by performing signal processing based on the output signal 110.

Mechanical play is described below.

Figure 2A:
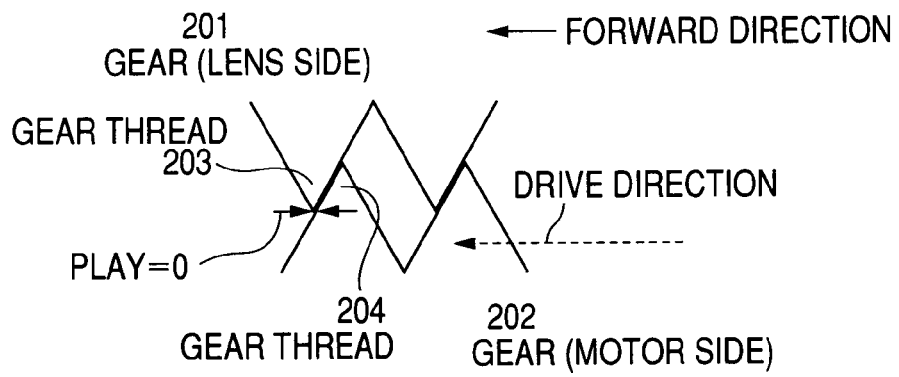
FIGS. 2A, 2B and 2C are diagrams for explaining how the gears to drive the zoom lens are engaged with each other.
Figure 2B:
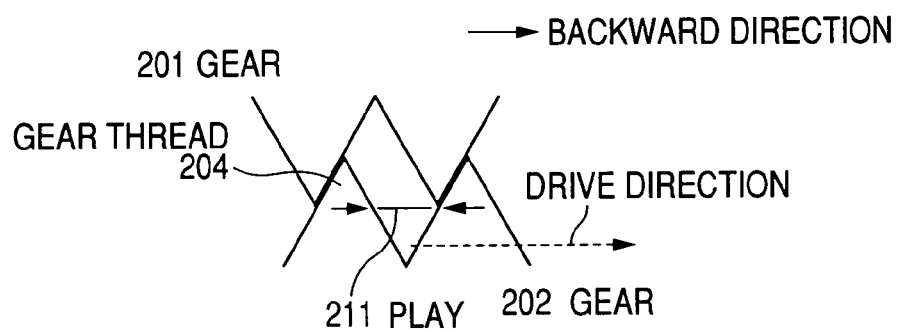
Figure 2C:
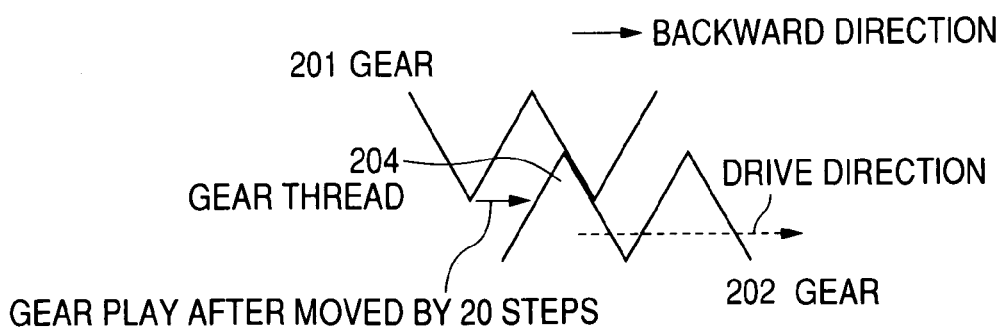

FIGS. 2A, 2B and 2C are schematic explanatory diagrams illustrating how the zoom gears 104 are engaged with each other in the lens unit 101. A gear 201 is on the side of the zoom lens 102 while a gear 202 is on the side of the zoom motor 106. It is assumed in the following description that the forward direction is right to left in FIGS. 2A to 2C.

Rotation of the stepping motor 106 is transmitted from the gear 202 to the zoom lens 102 via the gear 201. Here, if the zoom motor 106 continues rotating in the forward direction as shown in FIG. 2B, no play is generated since contact in the forward direction is kept between the left side of the gear thread 204 and the right side of the gear thread 203. In this case, rotation of the gear 202 is directly transmitted to the gear 201 to move the gear 201 in the forward direction.

If the drive direction is reversed, play 211 occurs between the gear 201 and the gear 202 as shown in FIG. 2B. Immediately after the drive direction is reversed, it is not possible to move the gear 201 in the backward direction since the right side of the gear thread 204 is in noncontact with the gear 201 in the backward direction.

For example, if the play 211 is equivalent to 20 steps, when the zoom motor 106 is rotated by 20 steps after the reversal, the right side of the gear thread 204 gets in contact with the gear 201 in the backward direction as shown in FIG. 2C. Beyond 20 steps, rotation of the zoom motor 106 moves the zoom lens 102 since rotation of the gear 202 is transmitted to the gear 201 in the backward direction. That is, if the drive direction is reversed, the zoom lens 102 does not move unless the zoom motor 106 is rotated more than the play 211.

Therefore, the control zoom position of the zoom lens 102, calculated by the zoom control circuit 114, may be different from the physical position of the zoom lens (hereinafter referred to as the physical zoom position) by the amount of play.

This is true of the relationship among the focus lens 103, the focus gear 105 and the focus motor 107. That is, the control focus position of the focus lens 103, calculated by the focus control circuit 115, may be different from the physical position by the amount of play.

With reference to FIGS. 3 through 6, the following provides a description of how the compensation calculation circuit 121 calculates the offset that compensates for mechanical play.

Firstly, assume that the physical zoom position of the zoom lens 102 is initially on the telephoto side of the zero reset position as shown in FIG. 3. Upon power on, the zoom lens 102 is moved in the wide angle direction until detected at the zero reset position by an origin sensor not shown in the figure. (Hereinafter, this operation is referred to as zero reset operation.) At this time, the left side of the gear thread 204 is in contact with the gear 201, that is, no play is generated on the wide angle side between the gear 202 and the gear 201. However, some play is generated on the telephoto side. In this example, the play on the telephoto side is assumed to be 20 steps.

If the zero reset operation is done, the zoom control circuit 114 sets the control zoom position to 0. If the zoom lens 102 is moved in the telephoto direction after that, the zoom control circuit 114 increments the control zoom position by 1 (+1) per step. If the zoom lens 102 is moved in the wide angle direction, the control zoom position is decremented by 1 (−1) per step. This allows the physical position of the zoom lens 102 to be controlled equivalently. Immediately after the zero reset operation is done, both the physical zoom position and the control zoom potions are zero.

Then, assume that the zoom lens 102 is moved further in the wide angle direction by 10 steps from the zero reset position as shown in FIG. 4. In this case, since there is no play on the wide angle side, both the gear 201 and the gear 202 travel the same distance in the wide angle direction. Therefore, the control zoom position has no error. Both the physical zoom position and the control zoom position change to +10.

However, if the zoom motor 106 is reversely driven by 10 steps to move the zoom lens 102 in the telephoto direction from the zero reset position as shown in FIG. 5, the gear 202 moves but the right side of the gear thread 204 cannot engage with the gear 201 due to the play. Therefore, since the gear 201 cannot move in the telephoto direction, the physical zoom position of the zoom lens 102 does not change. That is, the control zoom position changes to −10 although the physical zoom position remains zero, resulting in a mismatch between the physical zoom position and the calculated zoom position. Note that this 10-step drive leaves a 10-step play on either the telephoto side or the wide angle side between the gear 201 and the gear 202.

Therefore, in this case, the control zoom position must be corrected. If an offset of +10 is given, the control zoom position is corrected to zero, eliminating the mismatch with the physical zoom position.

Figure 6:
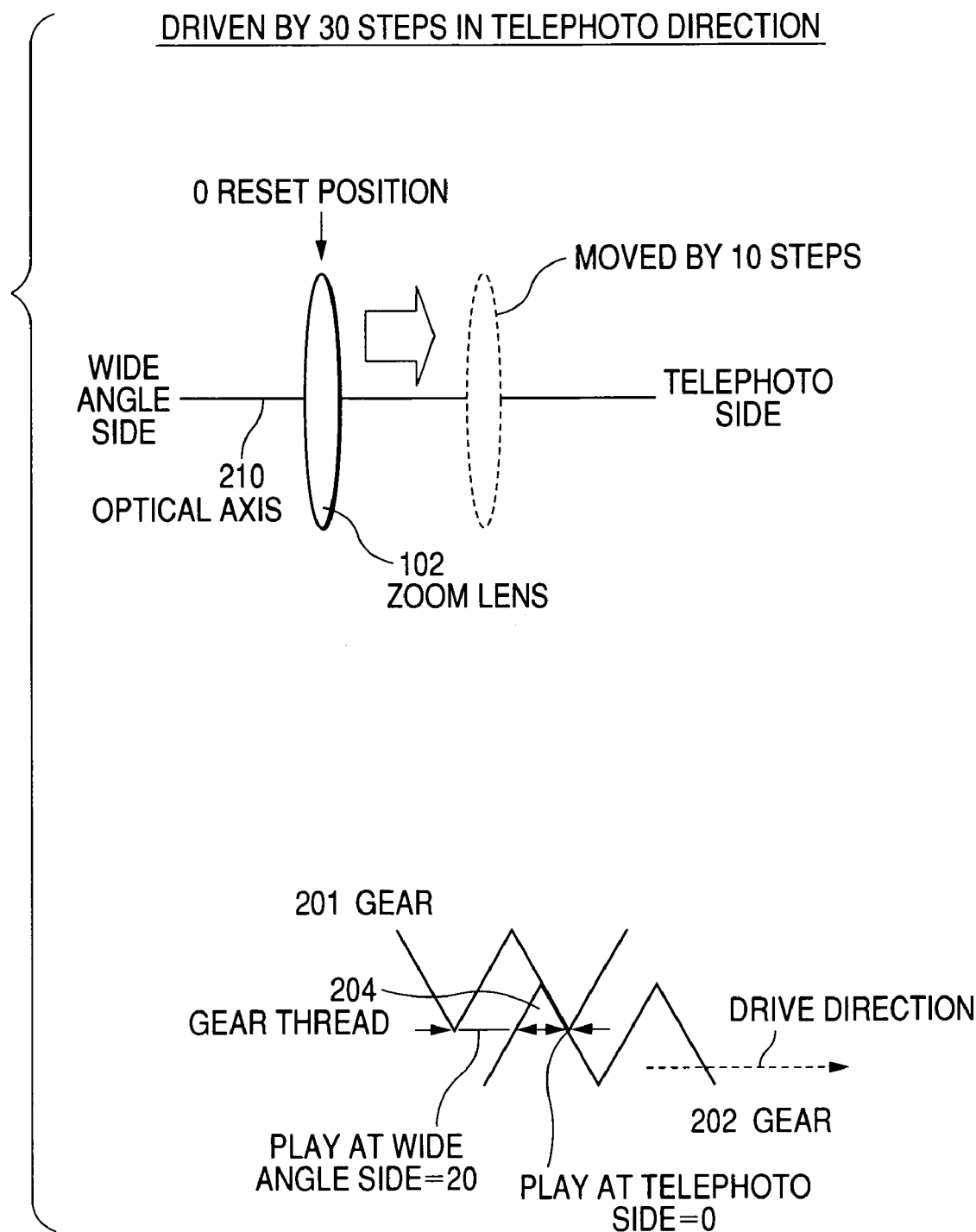
FIG. 6 is a diagram for explaining how play changes after the zoom lens is further moved in the telephoto direction.

Moreover, assume that as shown in FIG. 6, the zoom motor 106 is rotated by 30 steps to move the zoom lens 102 in the telephoto direction from the zero reset position shown in FIG. 3. In this case, the maximum play of 20 steps is cancelled when the zoom motor 106 is moved by 20 steps. Beyond 20 steps, both the gear 202 and the gear 201 move in the telephoto direction. This changes the physical position to −10 and the control zoom position to −30. No play is left on the telephoto side while a 20-step play is generated on the wide angle side. The control zoom position must be corrected in this example as well. If an offset of +20 is given, the control zoom position is corrected to −10, eliminating the mismatch with the physical zoom position.

As described with FIGS. 5 and 6, the control zoom position must be corrected if the moving direction of the zoom lens 101 is reversed.

In the above example, it is assumed that the zoom lens 102 is initially present on the telephoto side when the power supply is turned on. If the initial position is on the wide angle side, the zero reset operation generates no play on the telephoto side but some play on the wide angle side. The subsequent operations can also be explained as above.

Compensation is also calculated in the same manner for the focus lens 103. In this case, the close-up side of the focus lens 103 corresponds to the wide angle side of the zoom lens 102 in the same manner whereas the infinite side corresponds to the telephoto side.

As mentioned above, the amount of compensation to be given either on the telephoto side or on the wide angle side can always be calculated from the initial mechanical play, moving direction and moving steps of the zoom lens 102. This eliminates the deviation of the control zoom position from the physical zoom position.

According to the present invention, it is also possible to allow for the probable increase of the mechanical play after long use in the calculation of compensation as described below.

As shown in FIG. 1, a value supposed as the initial mechanical play is stored for the zoom lens 102 in the play memory 122.

Each time the zoom lens 102 is driven, the lens drive count calculation circuit 124 is operated. The lens drive count calculation circuit 124 increments the count in the count memory 125 by 1 each time the zoom control signal 112 is transferred to the zoom motor 106.

Concurrently, the direction of each drive according to the zoom control signal 112 is stored in the direction memory 117 by the drive direction detection circuit 116. By comparison with the previous drive direction, the drive direction detection circuit 116 detects whether the moving direction of the zoom lens 102 is reversed.

According to the drive direction detection circuit 116, the compensation calculation circuit 121 detects whether or not the drive direction of the zoom lens 102 is reversed. If the drive direction is reversed, the compensation calculation circuit 121 reads out the initial play value from the play memory 122, the current drive count from the lens drive count calculation circuit 124 and a compensation change corresponding to the current drive count from the compensation change table 123. According to the read information, the compensation calculation circuit 121 calculates the amount of compensation.

The following describes how the compensation change table 123 is set.

Figure 7:
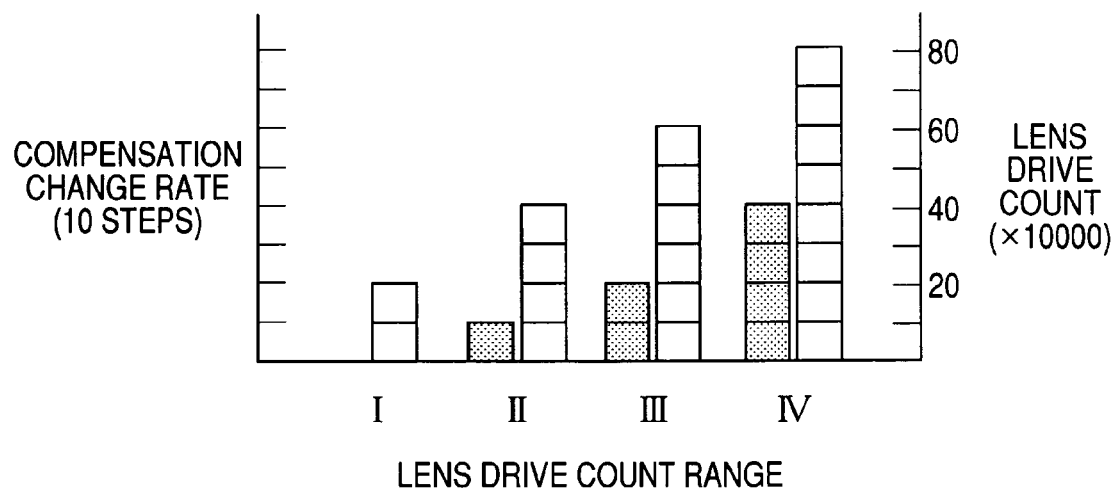
FIG. 7 is a diagram for explaining how a compensation change table is set according to the present invention.

FIG. 7 shows an example of setting compensation changes. To calculate an optimum amount of compensation which depends on the lens drive count, changes of the play expected to occur as results of long use are set. The horizontal axis is divided into intervals according to the lens drive count. The left vertical axis represents the change of compensation (10 steps per scale mark in the present embodiment). Each gray bar indicates the change of compensation from the preceding lens drive count interval. Each white bar, in association with the right vertical axis, specifies the count range of that lens drive count interval. Interval I is effective while the lens drive count is lower than 200,000. Between 200,000 and 400,000, interval II is effective. Between 400,000 and 600,000, interval III is effective. Beyond 600,000, interval IV is effective.

Since a value supposed to be the initial mechanical play is stored in the play memory 122, the change of compensation to be added in interval I is set to 0 steps in the compensation change table. For intervals II, III and IV, 10, 20 and 40 steps are set respectively based on the gradual increases of the mechanical play assumed to occur during long use.

The following describes how compensation is calculated by the compensation calculation circuit 121.

Figure 8:
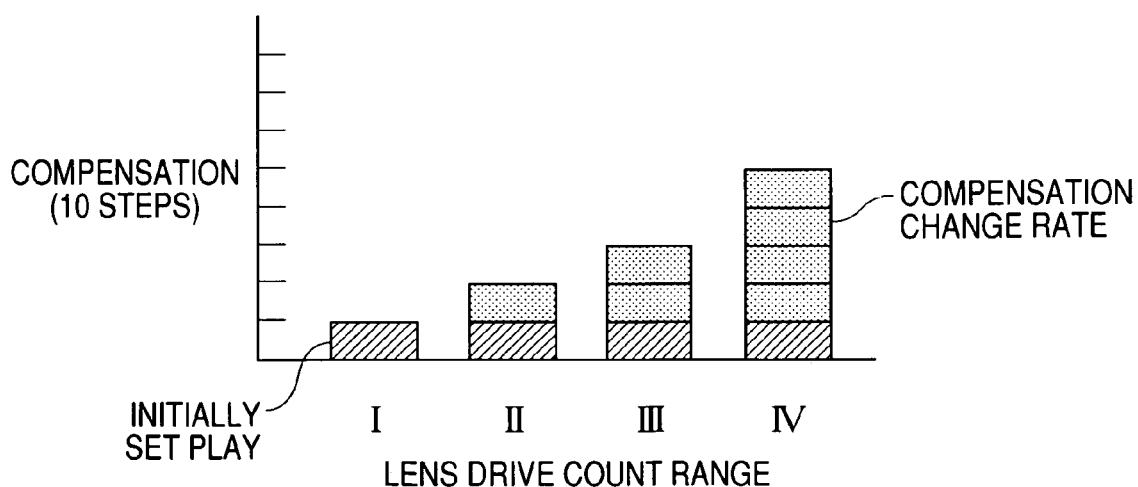
FIG. 8 is a diagram for explaining how the amount of compensation is determined for the control zoom position according to the present invention.

FIG. 8 shows what amount of compensation is given to the control zoom position. Like in FIG. 7, the horizontal axis is divided into lens drive count intervals while the vertical axis represents the amount of compensation (10 steps per scale mark in the present embodiment).

Assume that the compensation change table 123 is set as shown in FIG. 7 and the initial mechanical play of 10 steps is stored in the play memory 122. In this case, the amount of compensation for the control zoom position is 10 steps when the lens drive count is lower than 200,000 since the interval I setting of the compensation change table 123 is applied, that is, no step is added as the change of compensation to the initial play of 10 steps in the play memory 122. The shaded bar in interval I is therefore equal to the initial play of 10 steps. Likewise, the amount of compensation is 20 steps when the lens drive count is between 200,000 and 400,000 since the interval II setting is applied. Between 400,000 and 600,000, the amount of compensation is 30 steps since the interval III setting is applied. In and beyond interval IV, the amount of compensation is 50 steps.

Thus, although the mechanical play gradually increases as the lens drive count increases during long use, the zoom lens 102 can always be controlled to an optimum position by changing the amount of compensation according to the lens drive count.

The focus lens 103 can also be driven in the same manner. A value supposed as the initial mechanical play of the focus lens 103 is stored in the play memory 122. Drive count-dependent changes in the amount of compensation are defined in the compensation change table 123. The focus lens 103 can thus be controlled to an optimum position.

Note that although the present embodiment is designed to incorporate all components in the main body of the surveillance camera apparatus, some of the components may be placed to the outside. For example, the direction memory 117, the play memory 122 and the count memory 125 can be implemented by using memories in external apparatus such as a personal computer or portable information terminal.

Finally, the following describes what play value is stored in the play memory 122. As mentioned earlier, since the mechanical play is subject to manufacturing fluctuations, products of the same design do not have the same play. However, storing a typical value in the play memory 122 poses no problem unless the variance is large enough to cause a visually perceived difference in the zooming speed or focusing performance. Alternatively, the value to be stored in the play memory 122 may be determined through measurement with measuring equipment for each apparatus. Further, the play may be measured and stored in the play memory 122 each time the power on zero reset operation is done.

Likewise, setting typical changes of the play in the compensation change table 123 poses no problem unless the variances are large enough to cause a visually perceived difference in the zooming speed or focusing performance. Alternatively, the compensation change table 123 may be configured in such a manner that coefficients are set as multipliers of the play value stored in the play memory 122.

Embodiment 2

Figure 9:
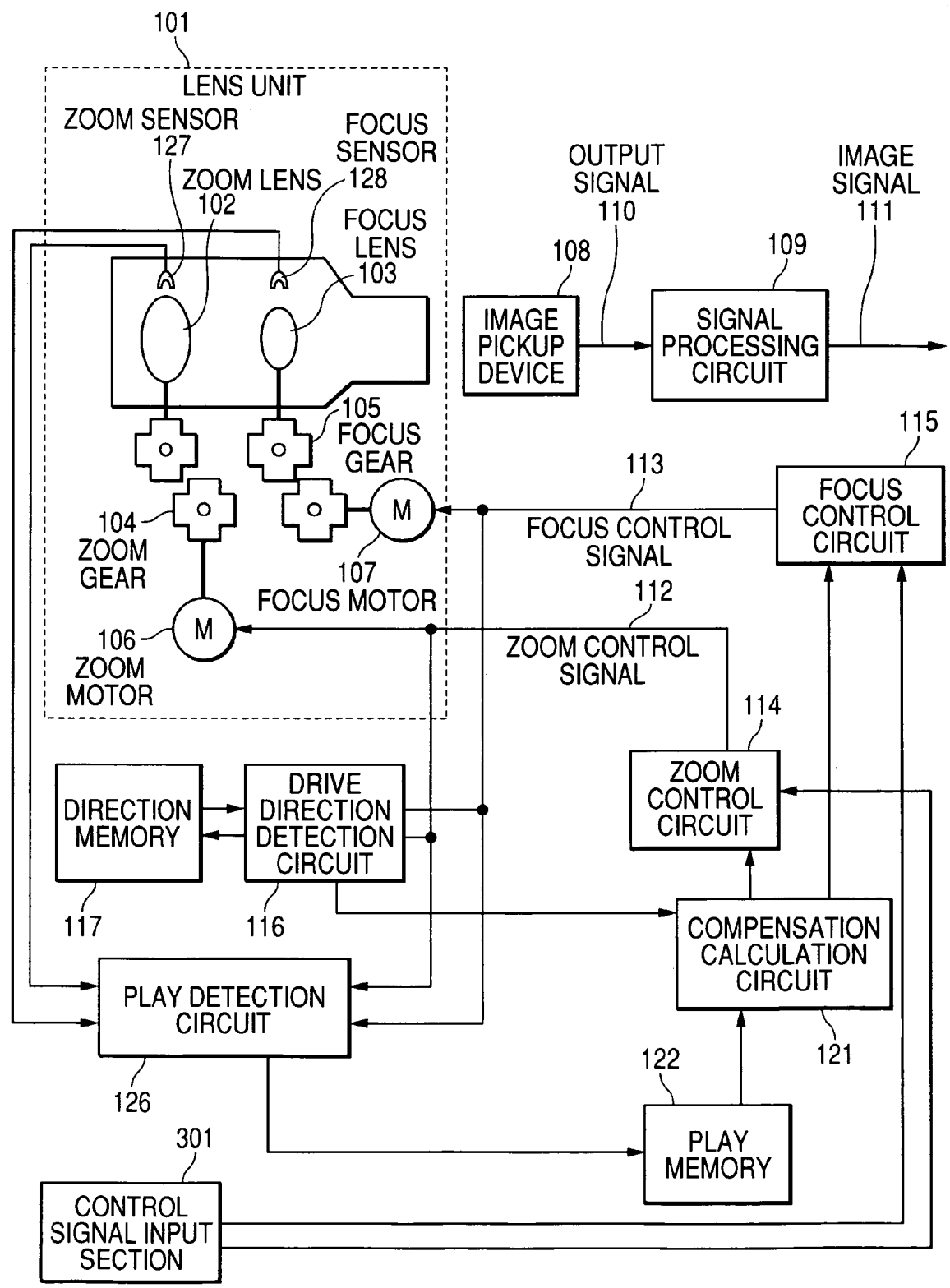
FIG. 9 is a block diagram of a surveillance camera apparatus according to a second embodiment of the present invention.

The following describes a second embodiment of the present invention with reference to FIG. 9.

FIG. 9 is a block diagram of a surveillance camera apparatus according to a second embodiment of the present invention (hereinafter referred to as the present embodiment). In this figure, numerals 126, 127 and 128 designate a play detection circuit, a zoom sensor and a focus sensor, respectively. The other blocks are identical to those in FIG. 1.

At first, the following describes how the play of the zoom lens 102 is detected. Similar to the first embodiment shown in FIG. 1, the zoom control signal 112 output from the zoom control circuit 114 controls the zoom lens 102 via the zoom motor 106 and the zoom gear 104.

The play detection circuit 126 continuously monitors not only the zoom control signal 112 output from the zoom control circuit 114 but also the physical zoom position of the zoom lens 102 by the zoom sensor 127 installed in the lens unit 101. The play detection circuit 126 can detect the mechanical play of the zoom lens by calculating the difference between the control zoom position by the zoom control circuit 114 and the physical zoom position of the zoom lens 102 obtained by the output of the zoom sensor 127. This play value is stored in the play memory 122 and updated each time play detection is made by the play detection circuit 126. Based on the value in the play memory 122, the amount of compensation is calculated by the compensation calculation circuit 121.

Thus, although the mechanical play gradually increases during long use, the zoom lens 102 can always be controlled to an optimum position since the amount of compensation is calculated according to the last detected amount of play.

The focus lens 103 is also driven in the same manner. The amount of play is repeatedly detected/updated by the play detection circuit 126 via the focus sensor or the like for storage in the play memory 122. The focus lens 103 can be controlled to an optimum position since the amount of compensation is calculated by the compensation calculation circuit 121 based on the value in the play memory 122.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. An imaging apparatus comprising:
   a lens which is movable along an optical axis;
   a driving module to drive the lens;
   a driving amount calculation module to determine a drive count indicating the number of times the driving module has been operated or a drive time for which the driving module has been operated;
   a storage module to store compensation amounts which are used to compensate for mechanical play of the driving module according to the drive count or the drive time; and
   a control module to control the driving module wherein a compensation amount appropriate for the drive count or time determined by the driving amount calculation module is selected from the compensation amounts stored in the storage module and the selected compensation amount is used to compensate for the mechanical play of the driving module.

2. An imaging apparatus arranged to form an optical image on an imaging surface of an image pickup device via a certain optical system and convert the optical image to an electrical signal for output, comprising:
   a zoom module to move a zoom lens of the optical system along the optical axis for magnifying or reducing the optical image of an object formed on the imaging surface;
   a zoom control module to control the zoom module by open loop control;

a focus module to move a focus lens of the optical system along the optical axis for focusing on the image of the object formed on the imaging surface;

a focus control module to control the focus module by open loop control;

a storage module to store compensation amounts which are used to compensate for respective mechanical plays of the zoom module and focus module;

a driving amount calculation module to determine an cumulative amount of lens driving operation performed by the zoom module or the focus module;

a compensation table used to change the amount of compensation for the mechanical play according to the cumulative amount of lens driving operation; and a compensation calculation module which based on the compensation amounts stored in the storage module, the cumulative amount determined by the driving amount calculation module and the compensation table, calculates a compensation amount for the mechanical play of the zoom module or the focus module.

3. An imaging apparatus according to claim 2, wherein the cumulative amount determined by the driving amount calculation module is a cumulative time.

4. An imaging apparatus according to claim 3, wherein the cumulative amount determined by the driving amount calculation module is a cumulative count.

5. An imaging apparatus according to any one of claims 2, 3 and 4, wherein the compensation table contains compensation coefficients.

* * * * *